(12) United States Patent
Kim et al.

(10) Patent No.: US 12,308,397 B2
(45) Date of Patent: May 20, 2025

(54) FUNCTIONAL SEPARATOR HAVING CATALYTIC SITES INTRODUCED THEREINTO, MANUFACTURING METHOD THEREFOR, AND LITHIUM SECONDARY BATTERY COMPRISING SAME

(71) Applicant: LG CHEM, LTD., Seoul (KR)

(72) Inventors: Kihyun Kim, Daejeon (KR); Minsu Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 673 days.

(21) Appl. No.: 17/289,090

(22) PCT Filed: Apr. 28, 2020

(86) PCT No.: PCT/KR2020/005615
§ 371 (c)(1),
(2) Date: Apr. 27, 2021

(87) PCT Pub. No.: WO2020/226329
PCT Pub. Date: Nov. 12, 2020

(65) Prior Publication Data
US 2022/0006131 A1    Jan. 6, 2022

(30) Foreign Application Priority Data

May 3, 2019  (KR) .................. 10-2019-0052321
Apr. 24, 2020 (KR) .................. 10-2020-0049799

(51) Int. Cl.
*H01M 10/42* (2006.01)
*H01M 10/052* (2010.01)
(Continued)

(52) U.S. Cl.
CPC ..... *H01M 10/4235* (2013.01); *H01M 10/052* (2013.01); *H01M 50/403* (2021.01);
(Continued)

(58) Field of Classification Search
CPC .......... H01M 10/4235; H01M 50/403; H01M 50/449; H01M 50/431; H01M 50/411; H01M 10/052
See application file for complete search history.

(56) References Cited

U.S. PATENT DOCUMENTS

2011/0020727 A1   1/2011  Burlatsky et al.
2013/0024601 A1*  1/2013  Floman ............... G06F 11/008
                                              711/E12.008
(Continued)

FOREIGN PATENT DOCUMENTS

CN    101965661 A    2/2011
CN    104508883 A    4/2015
(Continued)

OTHER PUBLICATIONS

KR1020100107012 English translation (Year: 2010).*
(Continued)

*Primary Examiner* — Lucas J. O'Donnell
(74) *Attorney, Agent, or Firm* — Birch, Stewart, Kolasch & Birch, LLP

(57) ABSTRACT

In order to solve the problems caused by lithium polysulfide leaching from the positive electrode, disclosed is a catalytic site-introduced functional separator, a method of manufacturing the same, and a lithium secondary battery including the same, which can improve the capacity and lifetime of the battery by coating a material, which can act as a reduction catalyst for lithium polysulfide, on the surface of the separator. The catalytic site-introduced functional separator includes a base separator and a catalytic site-containing coating layer located on the surface of the base separator.

14 Claims, 3 Drawing Sheets

(51) Int. Cl.
*H01M 50/403* (2021.01)
*H01M 50/411* (2021.01)
*H01M 50/431* (2021.01)
*H01M 50/449* (2021.01)

(52) U.S. Cl.
CPC ....... *H01M 50/411* (2021.01); *H01M 50/431* (2021.01); *H01M 50/449* (2021.01)

(56) References Cited

U.S. PATENT DOCUMENTS

| | | |
|---|---|---|
| 2014/0037915 A1 | 2/2014 | Rebouillat et al. |
| 2014/0255786 A1 | 9/2014 | Oh et al. |
| 2018/0026302 A1 | 1/2018 | Kumar et al. |
| 2018/0198156 A1 | 7/2018 | Lee et al. |
| 2019/0051940 A1 | 2/2019 | Park et al. |
| 2019/0123329 A1* | 4/2019 | Luo .................. H01M 50/457 |
| 2019/0123330 A1* | 4/2019 | Luo .................. H01M 50/431 |
| 2020/0321579 A1 | 10/2020 | Song et al. |

FOREIGN PATENT DOCUMENTS

| | | |
|---|---|---|
| CN | 106450102 A | 2/2017 |
| CN | 106848156 A | 6/2017 |
| CN | 107611373 A | 1/2018 |
| CN | 107768638 A | 3/2018 |
| CN | 107925042 A | 4/2018 |
| CN | 109103399 A | 12/2018 |
| CN | 109565018 A | 4/2019 |
| EP | 1 120 850 A1 | 8/2001 |
| EP | 3 312 906 A1 | 4/2018 |
| EP | 3 624 223 A1 | 3/2020 |
| ER | 10-2014-0111616 A | 8/2014 |
| JP | 2000-77103 A | 3/2000 |
| JP | 2011-509506 A | 3/2011 |
| JP | 2015-525692 A | 9/2015 |
| JP | 2018-520490 A | 7/2018 |
| JP | 2018206753 A * | 12/2018 .......... H01M 10/052 |
| KR | 10-2001-0082181 A | 8/2001 |
| KR | 10-2010-0107012 A | 10/2010 |
| KR | 10-2017-0108496 A | 8/2017 |
| KR | 10-2015-0040284 A | 4/2018 |
| KR | 10-2018-0133063 A | 12/2018 |
| KR | 10-2018-0136126 A | 12/2018 |
| WO | WO 2009/085327 A2 | 7/2009 |
| WO | WO 2017/099420 A1 | 8/2017 |

OTHER PUBLICATIONS

Song et al., Fe—N-Doped carbon nanofiber and graphene modified separator for lithium sulfur batteries, Chemical Engineering Journal 333 (2018) 564-571' (Year: 2018).*

Zuo et al., Facilitating the redox reaction of polysulfides by an electrocatalytic layer-modified separator for lithium-sulfur batteries; J. Mater. Chem. A, 2017, 5, 10936-10945 (Year: 2017).*

Dolbin et al, The effect of the thermal reduction temperature on the structure and sorption capacity of reduced graphene oxide materials, Applied Surface Science, vol. 361, 2016, pp. 213-220, ISSN 0169-4332. (Year: 2016).*

Huang et al., "Enhanced Polysulfide Redox kinetics Electrocatalyzed by Cobalt Phthalocyanine for Advanced Lithium-Sulfur Batteries," Journal of Materials Chemistry A, vol. 6, 2018, pp. 17132-17141.

International Search Report (PCT/ISA/210) issued in PCT/KR2020/005615, dated Aug. 5, 2020.

Pang et al., "Synergetic Protective Effect of the Ultalight MWCNTs/NCQDs Modified Separator for Highly Stable Lithium-Sulfur Batteries," Adv. Energy Mater., 1702288, 2018, pp. 1-11.

Yang et al., "Electrode Characteristics and Lithiation Mechanism of FePc/GN Composites," Int. J. Electrochem. Sci., vol. 13, 2018, pp. 2606-2616.

Extended European Search Report for European Application No. 20801822.6, dated Dec. 10. 2021.

Fletcher et al., "Supercatalysis by Superexchange," The Journal of Physical Chemistry, vol. 120, 2016, pp. 26225-26234.

* cited by examiner

[Figure 1]
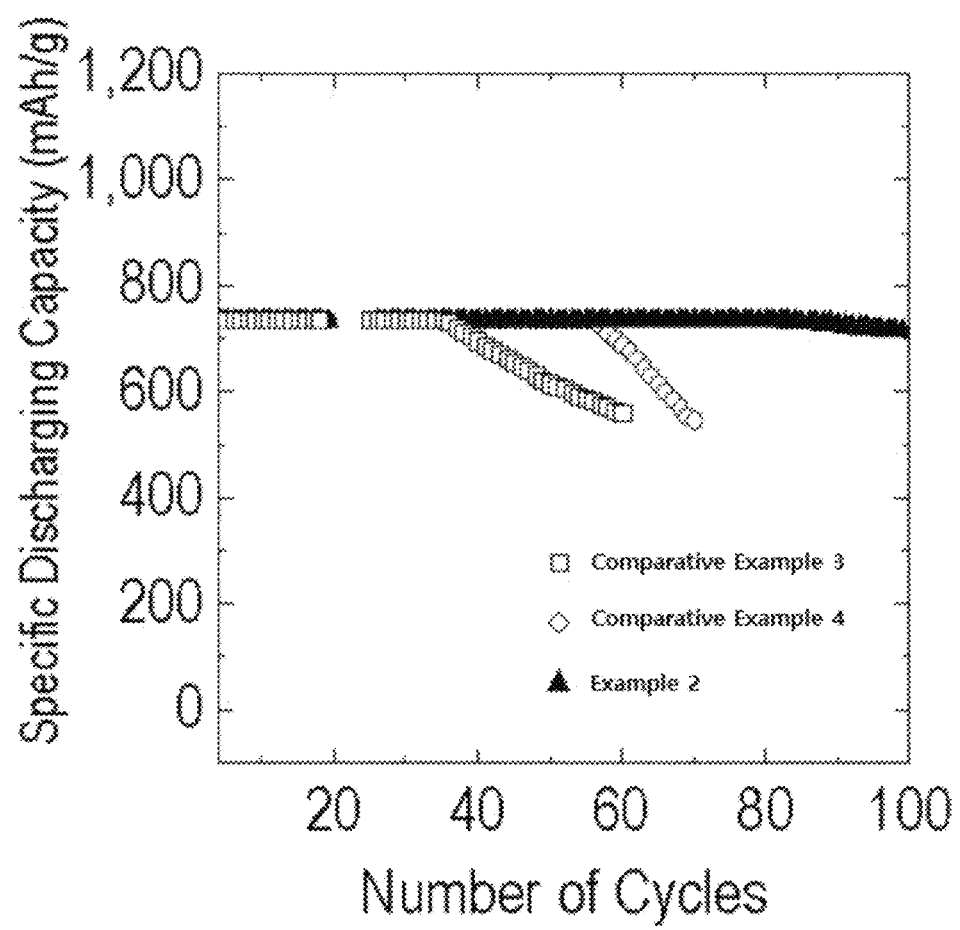

[Figure 2]
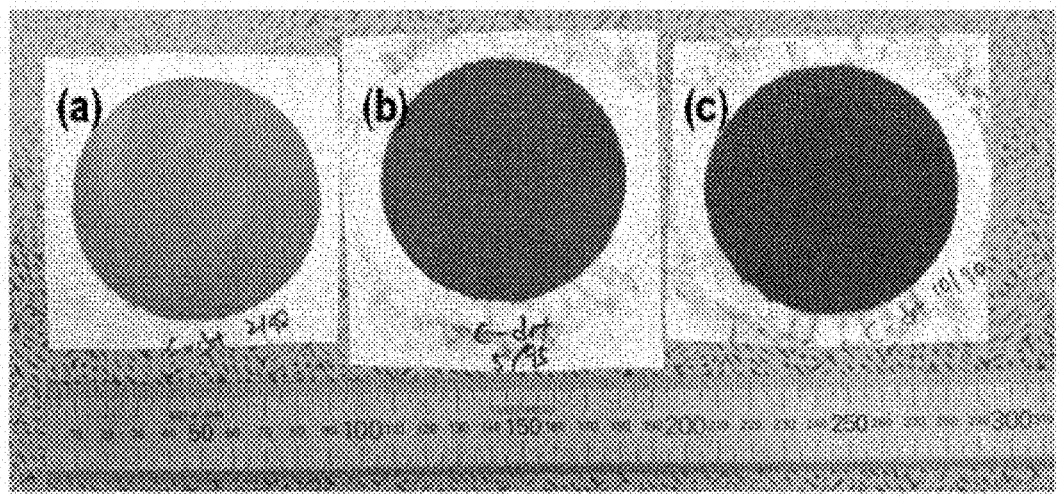
[Figure 3]
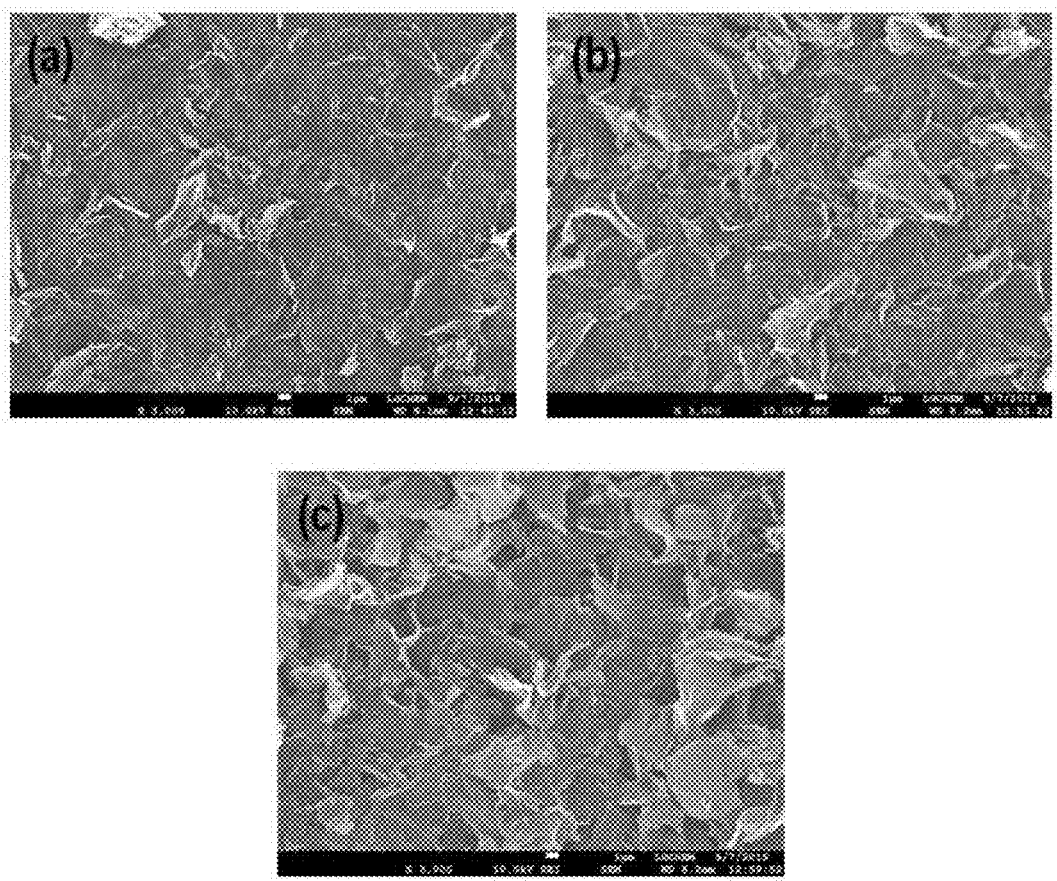

[Figure 4]
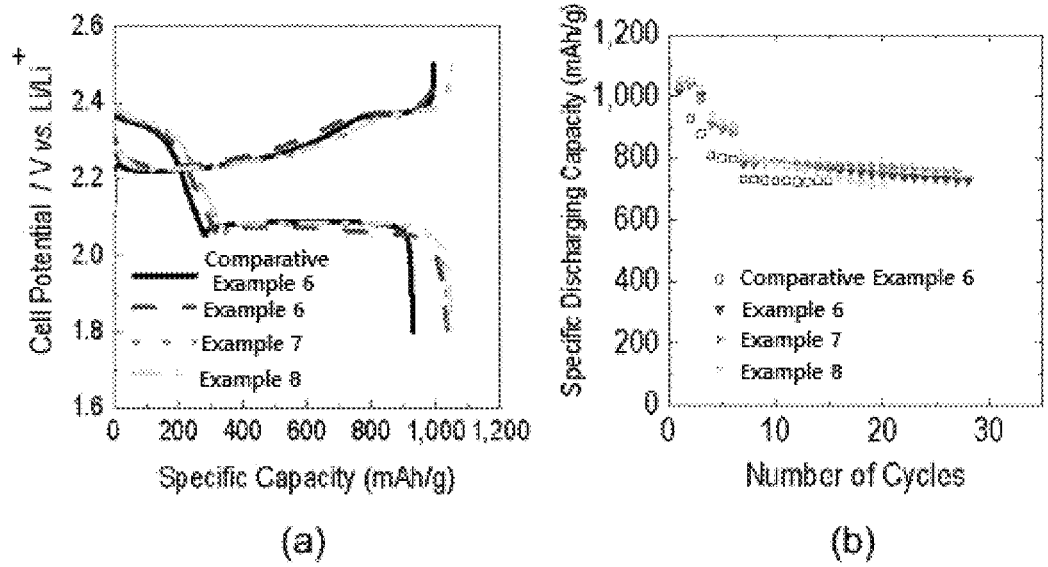
(a)        (b)
[Figure 5]
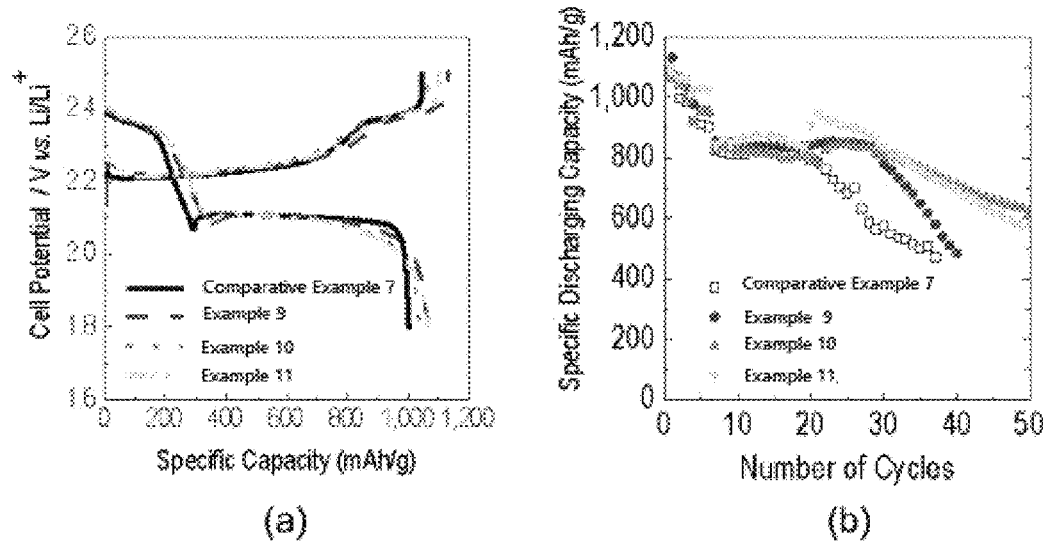
(a)        (b)

FUNCTIONAL SEPARATOR HAVING CATALYTIC SITES INTRODUCED THEREINTO, MANUFACTURING METHOD THEREFOR, AND LITHIUM SECONDARY BATTERY COMPRISING SAME

TECHNICAL FIELD

This application claims the benefits of priorities based on Korean Patent Application No. 10-2019-0052321 filed on May 3, 2019 and Korean Patent Application No. 10-2020-0049799 filed on Apr. 24, 2020, the entire contents of which are incorporated herein by reference.

The present invention relates to a catalytic site-introduced functional separator, a method for manufacturing the same, and a lithium secondary battery comprising the same, more particularly, to a catalytic site-introduced functional separator, which is capable of improving the capacity and lifetime of the battery by coating a material capable of acting as a reduction catalyst for the lithium polysulfide on the surface of the separator to solve the problem caused by lithium polysulfide leached in the positive electrode, a method for manufacturing the same, and a lithium secondary battery comprising the same.

BACKGROUND ART

As interest in energy storage technology continues to increase, since its application is expanding from energy for mobile phones, tablets, laptops and camcorders to even energy for electric vehicles (EVs) and hybrid electric vehicles (HEVs), research and development of electrochemical devices are gradually increasing. The field of electrochemical devices is an area that is receiving the most attention in this respect. Among them, the development of secondary batteries such as a lithium-sulfur battery capable of being charged/discharged has become a focus of attention. In recent years, in developing these batteries, in order to improve capacity density and specific energy, it has led to research and development in designs for new electrodes and batteries.

Among these electrochemical devices, a lithium-sulfur battery (Li-S battery) has a high energy density (theoretical capacity) and thus is in the spotlight as a next-generation secondary battery that can replace a lithium-ion battery. In such a lithium-sulfur battery, a reduction reaction of sulfur and an oxidation reaction of lithium metal occur during discharge. At this time, sulfur forms lithium polysulfide (LiPS) having a linear structure from $S_8$ having a ring structure. This lithium-sulfur battery is characterized by showing a stepwise discharging voltage until the polysulfide is completely reduced to $Li_2S$.

However, the biggest obstacle of the lithium-sulfur battery in the commercialization is the leaching and shuttle phenomenon of the lithium polysulfide, which causes a big problem that the capacity of the lithium-sulfur battery is reduced. That is, since polysulfide leached from the positive electrode has high solubility in the organic electrolyte solution, undesired polysulfide migration (PS shuttling) to the negative electrode through the electrolyte solution may occur. As a result, a decrease in capacity due to irreversible loss of the positive electrode active material and a decrease in the lifetime of the battery by deposition of sulfur particles on the surface of the lithium metal due to side reactions are occurred. In order to solve these problems, various studies such as adding PS adsorbent to the positive electrode composite or modifying the separator made of existing PE, etc. are being conducted, but it is a real state that no clear solution has been suggested.

In this regard, Korean Laid-open Patent Publication No. 10-2017-0108496 (hereinafter referred to as 0108496, Applicant: Ulsan Institute of Science and Technology, Publication date: Sep. 27, 2017) discloses a lithium-sulfur battery for improving a problem that performance of the lithium-sulfur battery deteriorates due to leaching of polysulfide. That is, the lithium-sulfur battery of 0108496 has a structure in which a positive electrode, an intermediate layer (or porous and conductive film), a separator, and a negative electrode are sequentially located, and aims to block the movement of polysulfide out of the positive electrode, while allowing lithium ions to move smoothly, by making the intermediate layer include a porous matrix containing metal phthalocyanine (i.e. include NiPc-PBBA COF or ZnPc-Py COF, etc.).

However, when the substrate containing the metal phthalocyanine is physically separated from the separator, as in the intermediate layer in 0108496, and also, the non-conductive COF (Covalent-Organic Framework) is coupled to the metal phthalocyanine (NiPc, ZnPc), there are many concerns that various problems will occur and the performance of the battery will decrease. That is, the COF of 0108496 cannot act as a reduction catalyst and contains pores inside it, so it is only adsorbing lithium polysulfide leached from a positive electrode, and has no electronic conductivity and thus there may be a problem that it remains unreduced in the region without having a conductive network (carbon structure). Accordingly, the above 0108496 has a disadvantage that it must use a first matrix, which is conductive carbon layer, to complement for it, and it has to be made to a thickness of several tens of μm (actual Experimental Example: 45 μm), in order to make it free-standing (It is obvious that if such a thick matrix is used, the energy density per weight and volume will decrease, and thus it is very disadvantageous in terms of battery performance).

In addition, in the case of the COF of 0108496, since lithium polysulfide must be adsorbed to the internal pores, it can be effective only when the amount of use thereof must be increased. For this reason, bonding COF to the catalytic site is very disadvantageous in terms of efficiency and energy density. In addition, when the conductive network is lost and the lithium polysulfide is accumulated inside the COF, there is a concern that the discharging amount decreases due to the loss of active material, and these materials may act as a resistance, resulting in deterioration of battery performance. Therefore, there is an urgent need to develop new separators and lithium secondary batteries that can fundamentally prevent the above problems.

PRIOR ART DOCUMENT

Patent Document (Patent Document 1) Korean Laid-open Patent Publication No. 10-2017-0108496

DISCLOSURE

Technical Problem

Therefore, it is an object of the present invention to provide a catalytic site-introduced functional separator, a manufacturing method thereof, and a lithium secondary battery comprising the same, which can improve the capacity and lifetime of the battery by forming metal phthalocyanine catalytic sites, which can act as a reduction catalyst for lithium polysulfide, on the surface of the separator, or by forming a coating layer containing even conductive carbon thereon, in order to solve the problem caused by lithium polysulfide leaching from the positive electrode.

Technical Solution

In order to achieve the above object, the present invention provides a catalytic site-introduced functional separator comprising a base separator and a catalytic site-containing coating layer located on the surface of the base separator.

In addition, the present invention provides a method for manufacturing the catalytic site-introduced functional separator comprising the steps of (a) preparing a dispersion containing catalytic sites by dispersing the catalytic sites in a solvent; (b) filtering the prepared catalytic site-containing dispersion; (c) obtaining and drying the catalytic site-containing powder from the upper layer of the filtrate obtained through the filtration; and (d) coating the obtained and dried catalytic site-containing powder on the surface of the base separator.

In addition, the present invention provides a lithium secondary battery comprising a positive electrode, a negative electrode, a catalytic site-introduced functional separator interposed between the positive electrode and the negative electrode, and an electrolyte.

Advantageous Effects

The catalytic site-introduced functional separator, a method for manufacturing the same, and a lithium secondary battery comprising the same according to the present invention has the advantage of improving the capacity and lifetime of the battery by forming metal phthalocyanine catalytic sites, which can act as a reduction catalyst for lithium polysulfide, on the surface of the separator or by forming a coating layer containing even conductive carbon thereon, in order to solve the problem caused by lithium polysulfide leaching from the positive electrode.

DESCRIPTION OF DRAWINGS

FIG. 1 is a graph showing lifetime characteristics of lithium secondary batteries according to an example of the present invention and comparative examples.

FIG. 2 is a real image of the catalytic site-introduced functional separator according to the present invention.

FIG. 3 is an image observed by electron microscope of the catalytic site-introduced functional separator according to the present invention.

FIGS. 4 and 5 are graphs showing discharging capacity (a) and lifetime characteristics (b) of the lithium secondary batteries according to examples of the present invention and a comparative example.

BEST MODE

Hereinafter, the present invention will be described in detail.

The catalytic site-introduced functional separator according to the present invention comprises a base separator and a catalytic site-containing coating layer located on the surface of the base separator.

The separator is interposed between the positive electrode and the negative electrode (that is, a physical separator having a function of physically separating the electrodes), and enables the transport of lithium ions between the positive electrode and the negative electrode, while separating or insulating the positive electrode and the negative electrode from each other. In particular, the separator is preferred as it has a low resistance to ion migration of the electrolyte and an excellent electrolyte impregnation ability, and the separator can be made of a porous, non-conductive or insulating material.

Meanwhile, the base separator on which a coating layer containing catalytic sites is not formed may be an independent member such as a film or a coating layer added (adhered, etc.) to any one or more of positive and negative electrodes. Specifically, as a base separator, porous polymer films, for example, porous polymer films made of polyolefin-based polymers, such as an ethylene homopolymer, a propylene homopolymer, an ethylene/butene copolymer, an ethylene/hexene copolymer and an ethylene/methacrylate copolymer may be used alone or may be stacked and used, or the base separator may be a conventional porous nonwoven fabric, for example, a non-woven fabric made of high melting point glass fiber or polyethylene terephthalate fiber, but is not limited thereto.

The present invention has the feature of improving the capacity and lifetime of the battery by forming metal phthalocyanine catalytic sites (specifically, transition metal-nitrogen-carbon catalytic sites), which can serve as a reduction catalyst for lithium polysulfide, on the surface of the base separator, or by forming a catalytic site-containing coating layer, which contains metal phthalocyanine catalytic sites introduced on the inside and outside of the conductive carbon with high specific surface area and high porosity, on the surface of the base separator, in order to solve the problem caused by lithium polysulfide leaching from the positive electrode, as described above. Therefore, the catalytic site-introduced functional separator of the present invention can be applied to various energy storage devices including lithium secondary batteries such as lithium-sulfur batteries that require high catalytic effect.

The catalytic site is a composite formed by bonding a nitrogen atom to a transition metal, and bonding a carbon atom to the nitrogen atom, and can improve the kinetic of various energy storage devices by acting as a catalyst on the surface of the base separator (at least one of the outer surface and the inner surface in the pores). That is, the catalytic site is adsorbed and bonded to any one or more of the outer surface of the base separator and the surface within the pores. Therefore, the catalytic site may be suitable as a catalyst for separators of lithium secondary batteries, particularly lithium-sulfur batteries, among energy storage devices.

More specifically, the catalytic site is a type of a macrocyclic compound having a structure in which a ring of nitrogen atoms and carbon atoms intersects, and has a chemical structure in which metal ions are coordinated at its center. In other words, the catalytic site may comprise a continuous bond (or sequential bond) of transition metal-nitrogen-carbon. In the catalytic site, the number of nitrogen atoms bonded to the transition metal is preferably four. If the number of nitrogen atoms bonded to the transition metal is less than 4, the activity as a catalyst may be reduced. If the number of nitrogen atoms bonded to the transition metal exceeds 4, structural stability may be lowered and thus catalyst activity may be lowered. As described above, if nitrogen is bonded to the transition metal, since its structure is not only stable, but also exhibits excellent catalytic properties, it can exhibit very high stability and catalytic effect, as compared to the catalytic site formed by bonding different types of atoms other than nitrogen atom to a transition metal.

In the catalytic site, the molar ratio of transition metal and nitrogen may be 1:2 to 10, preferably 1:2 to 8, and more preferably 1:3 to 5. If the molar ratio of the transition metal and nitrogen is outside the above range, the surface of the base separator may not be sufficiently doped as required by the catalytic site, or the amount of nitrogen per unit weight may increase, resulting in a decrease in catalyst activity.

In addition, the catalytic site is a nano-level composite having a size of 0.1 to 10 nm, preferably 0.5 to 8 nm, and more preferably 0.5 to 5 nm, and even if the catalytic site is bonded to the inner surface of the pores of the base separator, there is almost no reduction in the volume and size of the pores, and when lithium ions pass through the pores, clogging of the pores does not occur.

In addition, the transition metal may be at least one selected from the group consisting of iron (Fe), nickel (Ni), manganese (Mn), copper (Cu), and zinc (Zn), but is not limited thereto as long as it is a transition metal capable of exhibiting catalytic activity. In addition, the catalytic site may be exemplified by metal-phthalocyanine (MePc), for example, iron phthalocyanine (FePc), nickel phthalocyanine (NiPc), manganese phthalocyanine (MnPc), copper phthalocyanine (CuPc), zinc phthalocyanine (ZnPc), and mixtures thereof.

The catalytic site-containing coating layer may be formed on a part of the surface of the base separator, but preferably is formed on the entire surface of the base separator in order to maximize the expression of the effect of using the catalytic site (if necessary, up to conductive carbon). The thickness of the catalytic site-containing coating layer is 0.1 to 20 μm, preferably 0.5 to 10 μm, and more preferably 1 to 8 μm (even when conductive carbon to be described later is contained in the coating layer). If the thickness of the catalytic site-containing coating layer is less than 0.1 μm, there may be a problem that the conductive network is not sufficiently formed, thereby resulting in a decrease in electronic conductivity. If the thickness of the catalytic site-containing coating layer exceeds 20 μm, the passage of lithium ions is hindered, the cell resistance increases, and there is a concern that an adverse problem occurs in terms of energy density per volume.

In addition, the content of the catalytic site-containing coating layer is 1 to 200 μg/cm$^2$, preferably 10 to 150 μg/cm$^2$, more preferably 20 to 120 μg/cm$^2$, relative to the surface area of the base separator to be coated (even when conductive carbon to be described later is contained in the coating layer). If the coating content of the catalytic site-containing coating layer is less than 1 μg/cm$^2$ relative to the surface area of the base separator, the effect of using the catalytic site may be insufficient. If the coating content of the catalytic site-containing coating layer exceeds 200 μg/cm$^2$, there may be no further effect obtained by using the catalytic site.

Meanwhile, the catalytic site-introduced functional separator according to the present invention may further comprise conductive carbon in the catalytic site-containing coating layer. Therefore, the conductive carbon is also coated on the surface of the base separator, and serves to support the inorganic material, and since the conductive carbon itself has a pore structure, the electrolyte solution can freely enter and exit. In addition, the conductive carbon, as its name suggests, has conductivity, and by this property, can reduce lithium polysulfide by transferring electrons to a supported material such as the catalytic site.

If the catalytic site-containing coating layer further contains the conductive carbon as described above, the catalytic site may be bonded to any one or more of the outer surface of the conductive carbon and the inner surface of pores of the conductive carbon, and specifically may be adsorbed and bonded to the outer surface of the conductive carbon and the inner surface of the pores through van der Waals attraction. That is, the van der Waals action has a binding form between a surface and a surface, which is not a specific element-to-element bond, and thus can exhibit a strong adsorption power as compared to other types of bonds. Therefore, even if a catalytic site is bonded to the surface of the conductive carbon, the original characteristics of the conductive carbon can be maintained. In addition, if the catalytic site-containing coating layer further comprises the conductive carbon, the mixing ratio of the catalytic site and the conductive carbon may be 0.1 to 99.9:10 to 90 as a weight ratio.

The conductive carbons may be applied without particular limitation as long as they are conductive carbon materials capable of exhibiting the above effects. Among them, carbon nanotubes (CNT), graphene, and reduced graphene oxide (rGO) can be exemplified, and the use of the reduced graphene oxide is preferable, and it is more preferable to use thermally exfoliated reduced graphene oxide (TErGO), which is advantageous in exfoliation due to thermal expansion and can thus coat thin and large areas, thereby exhibiting excellent performance.

The thermally exfoliated reduced graphene oxide (TErGO) may be formed by heat-treating graphene oxide to prepare a thermally expanded graphene oxide (or thermally exfoliated graphene oxide) and then reducing it. At this time, the heat treatment for the preparation of the thermally expanded graphene oxide may be performed by a known method or various modified methods thereof, and is not particularly limited in the present invention. For example, the heat treatment may be performed for 10 minutes to 3 hours in a temperature range of 300 to 900° C.

In particular, the thermally exfoliated reduced graphene oxide (TErGO) is one which is exfoliated, and may have a thickness of 0.5 to 40 nm, preferably 5 to 30 nm, more preferably 10 to 20 nm, and may have a plate shape or flake shape. In addition, the degree of thermal expansion of the thermally exfoliated reduced graphene oxide (TErGO) may vary from 100 m$^2$/g to 900 m$^2$/g in the range of BET, and the degree of reduction can be measured through XPS or EA. In addition, the general graphene oxide may have a mass ratio of carbon and oxygen of about 1:1, whereas the reduced graphene oxide may have a mass ratio of carbon and oxygen of about 9:1.

In general, since the reduced graphene oxide before exfoliation has a thickness of about 50 to 500 nm and is easily detached when coated in the form of particles (even if it is not a separator), not only does it require the use of a binder, but also the coating density is low, so that the desired effect cannot be sufficiently obtained. However, according to the present invention, it is possible to uniformly and densely coat on the substrate by using thermally exfoliated reduced graphene oxide in the form of a plate or flake having a range of thickness through exfoliation.

In addition, the conductive carbon has pores formed in itself and the porosity of the conductive carbon is 40 to 90%, preferably 60 to 80%. If the porosity of the pores is less than 40%, the transfer of lithium ions may not be normally performed, thereby causing a problem by acting as a resistance component. If the porosity of the pores exceeds 90%, there may be a problem that the mechanical strength is lowered. In addition, the pore size of the conductive carbon is 10 nm to 5 µm, and preferably 50 nm to 5 µm. If the pore size is less than 10 nm, there may be a problem that lithium ion permeation is impossible. If the size of the pores exceeds 5 µm, there may be short circuit and safety problems due to contact between electrodes.

On the other hand, a binder may be interposed between the base separator and the catalytic site containing coating layer so that the catalytic site containing coating layer can be more easily coated on the surface of the base separator. However, in the case of using the thermally exfoliated reduced graphene oxide (TErGO) among the conductive carbon, in particular, reduced graphene oxide (rGO), of the present invention, since the conductive carbon is made of a plate-like or flake-like structure, the catalytic site containing coating layer can be free-standing without the binder and easily coated on the surface of the base separator.

The catalytic site-introduced functional separator as described above can be widely used in energy storage devices. Specifically, it can be used as a separator for a lithium secondary battery, and in particular, it can also be applied as a separator for a lithium-sulfur battery accompanied by a reduction reaction of sulfur to realize high performance of the battery, and it can also be advantageous in commercialization due to low manufacturing cost.

Here, more specifically, compared to the aforementioned prior art documents (Korean Laid-open Patent Publication No. 10-2017-0108496), the catalytic site of the present invention may serve as a reduction catalyst, whereas the non-conductive COF (Covalent-Organic Framework) of KR 10-2017-0108496 is impossible, and the COF contains pores therein and only serves to adsorb lithium polysulfide leached from the positive electrode. In comparison, the catalytic site of the present invention serves to reduce sulfur (S8) or long chain polysulfide to short chain polysulfide to increase the reaction rate and is advantageous for high rate discharging (C-rate).

In addition, in the case of KR 10-2017-0108496, COF has no electronic conductivity and may remain unreduced in a region without having a conductive network (carbon structure), whereas in the present invention, it is advantageous in terms of discharging amount by increasing the utilization of the active material. That is, in the case of KR 10-2017-0108496, there is a disadvantage that since the main material COF has no electronic conductivity, it must use a first matrix, which is a conductive carbon layer, to complement for it, and it has to be made to a thickness of several tens of µm (actual Experimental Example: 45 µm), in order to make it free-standing. If such a thick matrix is used, it is obvious that the energy density per weight and volume will decrease, and as a result, it is very disadvantageous in terms of battery performance. On the other hand, in the case of the present invention, it is possible to manufacture as thin as 20 µm or less by using the separator as a support, and is advantageous in terms of cell energy density.

In addition, since the catalytic site of the present invention is used as a reducing catalyst, it is possible to improve performance even with a minimum amount. However, in the case of COF of KR 10-2017-0108496, since lithium polysulfide must be adsorbed to the internal pores, the effect can be exhibited only when a large amount is used. For this reason, bonding COF to the catalytic site is very disadvantageous in terms of efficiency and energy density, and also, when the conductive network is lost and lithium polysulfide is accumulated inside the COF, the active materials are lost and the discharging amount is decreased and these materials act as a resistance, and as a result, there is a concern that the performance of the battery may be deteriorated.

Next, a method for manufacturing a catalytic site-introduced functional separator according to the present invention will be described. The method for manufacturing the catalytic site-introduced functional separator comprises the steps of (a) preparing a dispersion containing catalytic sites by dispersing the catalytic sites in a solvent, (b) filtering the prepared catalytic site-containing dispersion, (c) obtaining and drying the catalytic site-containing powder from the upper layer of the filtrate obtained through the filtration and (d) coating the obtained and dried catalytic site-containing powder on the surface of the base separator, and may further comprise, after the step (a), if necessary, a step of supplying conductive carbon to the prepared catalytic site-containing dispersion to prepare a catalytic site-containing dispersion containing even the conductive carbon (a-1).

In step (a), a catalytic site dispersion may be prepared by dispersing (or dissolving) the catalytic site in a solvent, and if necessary, after the catalytic site is dispersed in a solvent, a bath sonication can be performed to prepare a catalytic site dispersion. The concentration of the catalytic site dispersion may be 5 to 15%, preferably 5 to 12%, more preferably 5 to 10% relative to the weight of solid content. If the concentration of the catalytic site dispersion is less than 5% relative to the weight of solid content, there is a concern that the weight of the catalytic site is reduced, so that the catalyst activity may not be good. If the concentration of the catalytic site dispersion exceeds 15%, the content of the catalytic site may be excessive and pores of the base separator to be coated may be blocked.

The catalytic site is a metal-phthalocyanine (MePc) as described above, and for example, may be iron phthalocyanine (FePc), nickel phthalocyanine (NiPc), manganese phthalocyanine (MnPc), copper phthalocyanine (CuPc), zinc phthalocyanine (ZnPc) and mixtures thereof, etc. The catalytic site is a type of a macrocyclic compound having a structure in which a ring of nitrogen atom-carbon atom intersects, and has a chemical structure in which metal ions are coordinated at its center. As described above, since metal-phthalocyanine is used as a catalytic site, it is possible to manufacture a catalyst material containing a catalytic site having a stable structure in which four nitrogen atoms are bonded to a transition metal. In general, in order to bond four nitrogen atoms to the transition metal, there is a hassle that several steps of processes such as a step of reacting with a precursor material containing N and also performing an additional reaction under an ammonia ($NH_3$) atmosphere, etc. However, in the present invention, it is possible to produce a catalyst material in a simple process by using a metal-phthalocyanine having a chemical structure as described above.

The solvent used in step (a) may be at least one organic solvent selected from the group consisting of dimethyl carbonate, dimethyl formamide, N-methyl formamide, sulfolane (tetrahydrothiophene-1,1-dioxide), 3-methylsulfolan, N-butyl sulfone, dimethyl sulfoxide, N-(2-hydroxyethyl)-2-pyrrolidone (HEP), dimethylpiperidone(DMPD), N-methyl pyrrolidinone (NMP), N-methylacetamide, dimethylacetamide (DMAc), N,N-dimethylformamide (DMF), diethylacetamide (DEAc), dipropylacetamide (DPAc), ethanol, propanol, butanol, hexanol, isopropyl alcohol (IPA), ethylene glycol, tetrachloroethylene, propylene glycol, toluene, turpentine, methyl acetate, ethyl acetate, petroleum ether, acetone, cresol and glycerol. It may be desirable to use DMF to increase the solubility of the catalytic site.

Meanwhile, when supplying conductive carbon to the catalytic site-containing dispersion prepared after step (a) (step a-1), agitation may be performed, wherein the agitation may be performed at room temperature to 60° C. for 1 to 24 hours. Step (a-1) is a process through which a catalytic site is adsorbed and bonded (or introduced) to the surface of the conductive carbon. That is, step (a-1) is a process of adsorbing and bonding the transition metal-nitrogen-carbon catalytic sites to the inner and outer surfaces of the conductive carbon having high specific surface area and high porosity through van der Waals attraction. At this time, the mixing ratio of the catalytic site and the conductive carbon is as described above. On the other hand, even after adding the conductive carbon to the catalytic site-containing dispersion, ultrasonic treatment may be performed, if necessary.

The filtering in step (b) may apply a general filtration method such as a vacuum pump, and after the filtration process is performed, if necessary, a washing process using alcohol such as ethanol may be additionally performed.

Step (c) is a process of obtaining the catalytic site-containing powder from the upper layer of the filtrate obtained through filtration in the step (b) and then drying it. When conductive carbon is even applied, in order to improve the bonding force between the catalytic site and the conductive carbon, it may be preferable that the drying process is performed under a specific temperature and time. At this time, the drying may be performed at 60 to 100° C., preferably at a temperature of 65 to 95° C., more preferably 70 to 90° C., for 1 to 24 hours, preferably 5 to 20 hours, more preferably 10 to 14 hours.

Step (d) is a step in which a catalytic site-introduced functional separator according to the present invention is finally manufactured by coating the obtained and dried catalytic site-containing powder on the surface of the base separator. At this time, the coating may be performed by a drop-cast method, a dip-coating method, a blade coating method, a spray coating method, a Meyer bar coating method or a vacuum filtration method.

Lastly, a lithium secondary battery comprising the catalytic site-introduced functional separator provided by the present invention will be described. The lithium secondary battery comprising the catalytic site-introduced functional separator comprises a positive electrode, a negative electrode, a catalytic site-introduced functional separator interposed between the positive electrode and the negative electrode and an electrolyte, and can be exemplified as any lithium secondary battery known in the art, such as a lithium-sulfur battery, a lithium air battery, and a lithium metal battery, and is preferably a lithium-sulfur battery. The description of the functional separator comprised in the lithium secondary battery is as described above. In addition, the positive electrode, the negative electrode, and the electrolyte applied to the lithium secondary battery may be common ones used in the art, and detailed description thereof will be described later.

Meanwhile, the present invention can also provide a battery module comprising the lithium secondary battery as a unit cell and a battery pack including the same. The battery module or the battery pack may be used as a power source for any one or more medium and large-sized devices of a power tool; an electric vehicle including an electric vehicle (EV), a hybrid electric vehicle, and a plug-in hybrid electric vehicle (PHEV); or a power storage system, etc.

Hereinafter, a description of the positive electrode, the negative electrode and the electrolyte applied to the lithium secondary battery according to the present invention is added.

Positive Electrode

The positive electrode used in the present invention will be described below. After preparing a composition for the positive electrode containing the positive electrode active material, the electrically conductive material, and the binder, the slurry prepared by diluting such a composition in a predetermined solvent (disperse medium) can be directly coated and dried on a positive electrode current collector to form a positive electrode layer. Alternatively, after casting the slurry on a separate support, a film obtained by peeling from the support can be laminated on a positive electrode current collector to produce a positive electrode layer. In addition, the positive electrode can be manufactured in a variety of ways using methods well known to those skilled in the art.

The electrically conductive material not only serves as a path for electrons to move from the positive electrode current collector to the positive electrode active material, thereby imparting electronic conductivity, but also electrically connects the electrolyte and the positive electrode active material, thereby simultaneously serving as a path for lithium ions (Li+) in the electrolyte to move to and react with sulfur. Therefore, if the amount of the electrically conductive material is insufficient or the electrically conductive material does not perform properly, the non-reacting portion of sulfur in the electrode is increased and eventually the reduction of capacity is caused. Also, the high rate discharging characteristics and the charging/discharging cycle lifetime are adversely affected. Therefore, it is necessary to add an appropriate amount of the electrically conductive material. The electrically conductive material is preferably added in an amount of 0.01 to 30% by weight based on the total weight of the positive electrode composition.

The electrically conductive material is not particularly limited as long as it has electrical conductivity without causing chemical changes in the battery, and for example, graphite; carbon blacks such as Denka black, acetylene black, Ketjen black, channel black, furnace black, lamp black, and thermal black; electrically conductive fibers such as carbon fibers and metal fibers; carbon fluoride; metal powders such as aluminum, and nickel powder; electrically conductive whiskers such as zinc oxide and potassium titanate; electrically conductive metal oxides such as titanium oxide; electrically conductive materials such as polyphenylene derivatives and the like can be used. Specific examples of commercially available and electrically conductive materials may comprise acetylene black series of products from Chevron Chemical Company or Denka black (Denka Singapore Private Limited), products form Gulf Oil Company, Ketjen black, EC series of products from Armak Company, products of Vulcan XC-72 from Cabot Company and Super P (products from Timcal Company).

The binder is for attaching the positive electrode active material to the current collector well. The binder should be well dissolved in the solvent, and should not only constitute the conductive network between the positive electrode active material and the electrically conductive material, but also have a proper impregnation property into the electrolyte solution. The binder may be any binder known in the art, and specifically may be, but is not limited thereto, any one selected from the group consisting of fluororesin-based binders including polyvinylidene fluoride (PVdF) or polytetrafluoroethylene (PTFE); rubber-based binders including styrene-butadiene rubber, acrylonitrile-butadiene rubber, and styrene-isoprene rubber; cellulose-based binders including carboxymethylcellulose (CMC), starch, hydroxypropylcellulose, and regenerated cellulose; polyalcohol-based binders; polyolefin-based binders including polyethylene and polypropylene; polyimide-based binders, polyester-based binders, silane-based binders; and mixtures or copolymers of two or more thereof.

The content of the binder may be, but is not limited to, 0.5 to 30 wt. % based on the total weight of the composition for the positive electrode. If the content of the binder resin is less than 0.5 wt. %, the physical properties of the positive electrode may be deteriorated and thus positive electrode active material and the electrically conductive material can be broken away. If the content exceeds 30 wt. %, the ratio of the active material and the electrically conductive material in the positive electrode is relatively reduced and thus the battery capacity can be reduced and the content can act as a resistive element, reducing efficiency.

The composition for the positive electrode comprising the positive electrode active material, the electrically conductive material, and the binder may be diluted in a predetermined solvent and coated on a positive electrode current collector using a conventional method known in the art. First, a positive electrode current collector is prepared. The positive electrode current collector generally has a thickness of 3 to 500 µm. The positive electrode current collector is not particularly limited as long as it has a high electrical conductivity without causing chemical changes in the battery, and for example, may be stainless steel, aluminum, nickel, titanium, sintered carbon, or aluminum or stainless steel surface-treated with carbon, nickel, titanium, silver, or the like. The current collector can also increase the adhesive force of the positive electrode active material by forming fine irregularities on its surface and can be in various forms such as film, sheet, foil, net, porous body, foam, and nonwoven fabric.

Next, a slurry obtained by diluting the composition for the positive electrode containing the positive electrode active material, the electrically conductive material, and the binder in a solvent is applied to the positive electrode current collector. The composition for the positive electrode containing the above-described positive electrode active material, electrically conductive material, and binder may be mixed with a predetermined solvent to prepare the slurry. At this time, the solvent should be easy to dry, and it is most preferable to be able to dissolve the binder well, but to keep the positive electrode active material and the electrically conductive material in a dispersed state without dissolving. If the solvent dissolves the positive electrode active material, since the specific gravity (D=2.07) of sulfur in the slurry is high, there is a tendency that the sulfur is submerged in the slurry, which in turn causes sulfur to flow into the current collector during coating and cause problems in the electrically conductive network, thereby causing problems with regard to the operation of the battery. The solvent (disperse medium) may be water or an organic solvent. The organic solvent may be at least one selected from the group consisting of dimethylformamide, isopropyl alcohol, acetonitrile, methanol, ethanol and tetrahydrofuran.

Subsequently, there is no particular limitation on the method of applying the composition for the positive electrode in the slurry state. For example, a coating layer may be prepared by a doctor blade coating method, a dip coating method, a gravure coating method, a slit die coating method, a spin coating method, a comma coating method, a bar coating method, a reverse roll coating method, a screen coating method, and a cap coating method, etc. Thereafter, in the composition for the positive electrode that has undergone such a coating process, evaporation of the solvent (disperse medium), compaction of the coating film and adhesion between the coating film and the current collector is achieved through a drying process. At this time, drying is performed according to a conventional method, and is not particularly limited.

Negative Electrode

As the negative electrode, any one capable of intercalation and deintercalation of lithium ions can be used. For example, metal materials such as lithium metal and lithium alloy, and carbon materials such as low crystalline carbon and high crystalline carbon can be exemplified. As the low crystalline carbon, soft carbon and hard carbon are typical. As the high crystalline carbon, high temperature sintered carbon such as natural graphite, Kish graphite, pyrolytic carbon, mesophase pitch based carbon fiber, meso-carbon microbeads, mesophase pitches, and petroleum or coal tar pitch derived cokes are typical. In addition, alloy series containing silicon, oxides such as $Li_4Ti_5O_{12}$ or the like are also well-known negative electrodes.

In this case, the negative electrode may comprise a binder. The binder may be various kinds of binder polymers such as polyvinylidenefluoride (PVDF), polyvinylidenefluoride-hexafluoropropylene copolymer (PVDF-co-HFP), polyacrylonitrile, polymethylmethacrylate, and styrene-butadiene rubber (SBR).

The negative electrode may optionally further comprise a negative electrode current collector for supporting the negative electrode active layer containing the negative electrode active material and the binder. The negative electrode current collector may be specifically selected from the group consisting of copper, stainless steel, titanium, silver, palladium, nickel, alloys thereof, and combinations thereof. The stainless steel may be surface-treated with carbon, nickel, titanium or silver, and an aluminum-cadmium alloy may be used as an alloy. In addition, a sintered carbon, a nonconductive polymer surface-treated with a conductive material, or a conductive polymer may be used.

The binder serves to paste the negative electrode active material, to bond the active materials to each other, to bond the active material and the current collector, to buffer the expansion and contraction of the active material and so on. Specifically, the binder is the same as described above for the binder of the positive electrode. Also, the negative electrode may be lithium metal or lithium alloy. The non-limiting examples of the negative electrode may be a thin film of lithium metal, and may be an alloy of lithium and at least one metal selected from the group consisting of Na, K, Rb, Cs, Fr, Be, Mg, Ca, Sr, Ba, Ra, Al, and Sn.

Electrolyte

The electrolyte solution comprises solvents and lithium salt, and if necessary, may further contain additives. The solvent can be used without particular limitation, as long as it is a conventional non-aqueous solvent that serves as a medium through which ions involved in the electrochemical reaction of the battery can move. Examples of the non-aqueous solvent may comprise carbonate-based solvents, ester-based solvents, ether-based solvents, ketone-based solvents, alcohol-based solvents, aprotic solvents and the like.

More specifically, examples of the carbonate-based solvent may comprise dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC), or butylene carbonate (BC), etc. Examples of the ester-based solvent may specifically include methyl acetate, ethyl acetate, n-propyl acetate, 1,1-dimethyl ethyl acetate, methyl propionate, ethyl propionate, γ-butyrolactone, decanolide, valerolactone, and mevalonolactone, carprolactone, etc. Examples of the ether-based solvent may specifically include diethyl ether, dipropyl ether, dibutyl ether, dimethoxymethane, trimethoxymethane, dimethoxyethane, diethoxyethane, diglyme, triglyme, tetraglyme, tetrahydrofuran, 2-methyltetrahydrofuran, polyethylene glycol dimethyl ether, etc. In addition, examples of the ketone-based solvent may comprise cyclohexanone, etc. Examples of the alcohol-based solvent may comprise ethylalcohol, and isopropylalcohol, etc. Examples of the aprotic solvent may comprise nitriles such as acetonitrile, amides such as dimethylformamide, dioxolanes such as 1,3-dioxolane (DOL), sulfolane, etc. The non-aqueous organic solvents may be used alone or in combination of two or more. The mixing ratio when using in combination of two or more may be appropriately adjusted depending on the desired performance of the battery, and a solvent in which 1,3-dioxolane and dimethoxyethane are mixed in a volume ratio of 1:1 can be exemplified.

Hereinafter, preferred examples are provided to help understanding of the present invention, but the following examples are merely illustrative of the present invention, and it is apparent to those skilled in the art that various changes and modifications can be made within the scope and technical spirit of the present invention, and it is natural that such changes and modifications belong to the appended claims.

[EXAMPLE 1] PREPARATION OF CATALYTIC SITE-INTRODUCED FUNCTIONAL SEPARATOR

First, 60 mg of nickel phthalocyanine (NiPc, Aldrich), which is catalytic sites, was dispersed in 500 mL of N,N-dimethylformamide (DMF) as a solvent, followed by bath sonication for 10 minutes to give a nickel phthalocyanine (NiPc) dispersion.

Subsequently, the prepared nickel phthalocyanine (NiPc) dispersion was filtered with a vacuum pump, washed with 1000 ml of ethanol, and the upper powder of the filtrate was dried at 80° C. for 12 hours.

Finally, the dried powder was coated on the entire surface of a porous base separator made of polyethylene by vacuum filtration and then dried to prepare catalytic site-introduced functional separator. Meanwhile, at the time of the coating, the thickness of the coating was set to be 0.5 μm, and the coating amount was set to be 10 μg/cm$^2$.

[COMPARATIVE EXAMPLE 1] MANUFACTURE OF CONVENTIONAL SEPARATOR

A separator in a bare state made of polyethylene (PE) was prepared without coating of nickel phthalocyanine (NiPc) which is a catalytic site.

[COMPARATIVE EXAMPLE 2] MANUFACTURE OF CONVENTIONAL SEPARATOR

After manufacturing a composite by coating NiPc-PBBA COF containing metal phthalocyanine (wherein the raw material of COF is 1,4-benzenediboronic acid) on CNT paper, it was placed so as to face the separator in the bare state, thereby preparing a conventional separator in which the separator in the bare state and the composite were physically separated (corresponding to Korean Laid-open Patent Publication No. 10-2017-0108496, a prior art document).

[EXAMPLE 2 AND COMPARATIVE EXAMPLES 3 AND 4] MANUFACTURE OF LITHIUM SECONDARY BATTERY

Lithium-sulfur batteries in the form of coin cells comprising separators prepared in Example 1 and Comparative Examples 1 and 2, and 70 μℓ of electrolyte solution (DOL:DME (1:1(vol)), 1.0 M LiTFSI, 1 wt. % LiNO$_3$), sulfur as a positive electrode, and lithium metal as a negative electrode were manufactured (provided that in interposing the separator of Comparative Example 2 between the positive electrode and the negative electrode, the composite of entire separator was placed to face the side of the positive electrode).

[EXPERIMENTAL EXAMPLE 1] EVALUATION OF LIFETIME CHARACTERISTICS OF LITHIUM SECONDARY BATTERY

The discharging current rate of lithium-sulfur batteries prepared in Example 2 and Comparative Examples 3 and 4 as described above was fixed to 0.2 C, and the discharging amount was constantly limited (5 mAh) to observe lifetime characteristics, and the results are shown in FIG. 1. FIG. 1 is a graph showing lifetime characteristics of lithium secondary batteries according to an Example of the present invention and Comparative Examples. As shown in FIG. 1, it was confirmed that the lithium-sulfur battery of Example 2 to which a catalytic site-introduced functional separator was applied has excellent lifetime characteristics, as compared to the lithium-sulfur battery of Comparative Example 3 to which a conventional separator without introducing a catalytic site was applied and the lithium-sulfur battery of Comparative Example 4 to which the catalytic site was introduced but not coated on the separator.

[EXAMPLE 3] PREPARATION OF CATALYTIC SITE-INTRODUCED FUNCTIONAL SEPARATOR

First, 60 mg of nickel phthalocyanine (NiPc, Aldrich), which is a catalytic site, was dispersed in 500 mL of N,N-dimethylformamide (DMF) as a solvent, followed by bath sonication for 10 minutes to prepare a nickel phthalocyanine (NiPc) dispersion.

Subsequently, 940 mg of reduced graphene oxide (rGO, Sixth Element) was added to the prepared nickel phthalocyanine (NiPc) dispersion, followed by bath sonication for 10 minutes and stirring at room temperature at 500 rpm for 4 hours to obtain a mixture.

Subsequently, the mixture was filtered with a vacuum pump, washed with 1000 ml of ethanol, and the upper powder of the filtrate was dried at 80° C. for 12 hours.

Finally, the dried powder was coated on the entire surface of a porous base separator made of polyethylene by vacuum filtration and then dried to manufacture a catalytic site-introduced functional separator. On the other hand, the thickness of the coating during the coating was 1 μm, and the coating amount was 20 μg/cm².

[EXAMPLE 4] MANUFACTURE OF CATALYTIC SITE-INTRODUCED FUNCTIONAL SEPARATOR

A catalytic site-introduced functional separator was prepared in the same manner as in Example 3, except that the coating thickness was changed to be 4 μm and the coating amount was to be 60 μg/cm².

[EXAMPLE 5] MANUFACTURE OF CATALYTIC SITE-INTRODUCED FUNCTIONAL SEPARATOR

A catalytic site-introduced functional separator was prepared in the same manner as in Example 3, except that the coating thickness was changed to be 8 μm and the coating amount was to be 120 μg/cm².

[COMPARATIVE EXAMPLE 5] MANUFACTURE OF CONVENTIONAL SEPARATOR

Only the reduced graphene oxide (rGO, Sixth Element company) which is conductive carbon was surface-coated on the surface of the separator made of polyethylene (PE) to prepare a conventional separator.

[EXPERIMENTAL EXAMPLE 2] EVALUATION OF COATING UNIFORMITY OF CATALYTIC SITE-INTRODUCED FUNCTIONAL SEPARATOR

The coating uniformity of the catalytic site-introduced functional separators prepared in Examples 3 to 5 was evaluated. FIG. 2 is a real image of the catalytic site-introduced functional separator according to the present invention. FIGS. 2(a) to 2(c) correspond to Examples 3 to 5, respectively. FIG. 3 is an image observed by electron microscope of the catalytic site-introduced functional separator according to the present invention. (a) to (c) of FIG. 3 correspond to Examples 3 to 5, respectively. As shown in FIGS. 2 and 3, it was confirmed that in the catalytic site-introduced functional separator according to the present invention, the catalytic site-containing coating layer was uniformly well formed. In particular, from FIG. 3 in which the catalytic site-introduced functional separator was observed with an electron microscope, it can be seen that the catalytic site-containing coating layer was spread evenly in a plate shape without agglomeration.

[EXAMPLES 6 TO 8 AND COMPARATIVE EXAMPLE 6] MANUFACTURE OF LITHIUM SECONDARY BATTERY WITH SEPARATOR

Lithium-sulfur batteries in the form of a coin cell, which comprise each of the separators prepared in Examples 3 to 5 and Comparative Example 5, 70 μℓ of an electrolyte solution (DOL:DME (1:1), 1.0 M LiTFSI, 1 wt. % LiNO₃), sulfur as a positive electrode and lithium metal as a negative electrode, was manufactured.

[EXAMPLES 9 TO 11 AND COMPARATIVE EXAMPLE 7] MANUFACTURE OF LITHIUM SECONDARY BATTERY WITH SEPARATOR

Lithium-sulfur batteries in the form of a coin cell, which comprise each of the separators prepared in Examples 3 to 5 and Comparative Example 5, 70 μℓ of an electrolyte solution (DOL:DME (1:1(vol)), 1.0 M LiTFSI, 3 wt. % LiNO₃), sulfur as a positive electrode and lithium metal as a negative electrode, was manufactured.

[EXPERIMENTAL EXAMPLE 3] EVALUATION OF DISCHARGING CAPACITY AND LIFETIME CHARACTERISTICS OF LITHIUM SECONDARY BATTERY

First, the discharging current rates of the lithium-sulfur batteries prepared from Examples 6 to 8 and Comparative Example 6 were set to be 0.1 C (3 times), 0.2 C (3 times), and then 0.5 C, and then lifetime characteristics was observed. FIG. 4 is a graph showing discharging capacity (a) and lifetime characteristics (b) of the lithium secondary batteries according to an examples of the present invention and a comparative example. As shown in FIG. 4, it was confirmed that in the case of Examples 6 to 8 in which a catalytic site-introduced functional separator was applied to the lithium-sulfur battery, both discharging capacity and lifetime characteristics are excellent, as compared to the lithium-sulfur battery of Comparative Example 6 in which only conductive carbon was coated on the separator surface.

In addition, the discharging current rates of the lithium-sulfur batteries prepared from Examples 9 to 11 and Comparative Example 7 were set to be 0.1 C (3 times), 0.2 C (3 times), and then 0.5 C, and then lifetime characteristics were observed. FIG. 5 is a graph showing discharging capacity (a) and lifetime characteristics (b) of the lithium secondary batteries according to examples of the present invention and a comparative example. As shown in FIG. 5, it was confirmed that in the case of Examples 9 to 11 in which a catalytic site-introduced functional separator was applied to the lithium-sulfur battery, both discharging capacity and lifetime characteristics are excellent, as compared to the lithium-sulfur battery of Comparative Example 7 in which only conductive carbon was coated on the separator surface.

In addition, it was found that all lithium-sulfur batteries of Examples 6 to 11 exhibit excellent discharging capacity and lifetime characteristics regardless of the type of electrolyte, as compared to the lithium-sulfur battery in which only conductive carbon was coated on the surface of the separator.

The invention claimed is:

1. A catalytic site-introduced functional separator comprising:
   a base separator;
   a coating layer on at least one surface of the base separator, wherein the coating layer comprises a catalytic site; and a conductive carbon,
   wherein the catalytic site contains a continuous bond of transition metal-nitrogen-carbon;
   wherein the coating layer has a thickness of 0.1 μm to 20 μm,
   wherein a content of the coating layer is 10 μg/cm² to 150 μg/cm² relative to a surface area of the base separator,
   wherein the catalytic site is at least one selected from the group consisting of iron phthalocyanine (FePc), nickel phthalocyanine (NiPc), manganese phthalocyanine (MnPc), copper phthalocyanine (CuPc), and zinc phthalocyanine (ZnPc), and
   wherein a ratio of the catalytic site and the conductive carbon is 0.1 to 99.9:10 to 90 as a weight ratio.

2. The catalytic site-introduced functional separator according to claim 1, wherein the catalytic site has a size of 0.1 nm to 10 nm.

3. The catalytic site-introduced functional separator according to claim 1, wherein the coating layer has a thickness of 0.5 μm to 10 μm.

4. The catalytic site-introduced functional separator according to claim 1, wherein the catalytic site is adsorbed and bonded to an outer surface of the conductive carbon and an inner surface of pores of the conductive carbon through van der Waals attraction.

5. The catalytic site-introduced functional separator according to claim 1, wherein the conductive carbon is selected from the group consisting of carbon nanotubes, graphene, and reduced graphene oxide.

6. A method for manufacturing a catalytic site-introduced functional separator comprising the steps of,
(a) preparing a dispersion containing catalytic sites by dispersing the catalytic sites in a solvent;
(a-1) supplying conductive carbon to the catalytic site-containing dispersion prepared in step (a) to prepare a catalytic site-containing dispersion containing the conductive carbon;
(b) filtering the catalytic site-containing dispersion containing the conductive carbon prepared in step (a-1);
(c) obtaining and drying a catalytic site-containing powder from an upper layer of the filtrate obtained through the filtration; and
(d) coating the obtained and dried catalytic site-containing powder on at least one surface of a base separator to form a coating layer comprising a catalytic site on the surface of the base separator;
wherein the catalytic site on the separator contains a continuous bond of transition metal-nitrogen-carbon,
wherein a content of the coating layer is 10 μg/cm$^2$ to 150 μg/cm$^2$ relative to a surface area of the base separator,
wherein the catalytic site is at least one selected from the group consisting of iron phthalocyanine (FePc), nickel phthalocyanine (NiPc), manganese phthalocyanine (MnPc), copper phthalocyanine (CuPc), and zinc phthalocyanine (ZnPc), and
wherein a ratio of the catalytic site and the conductive carbon is 0.1 to 99.9:10 to 90 as a weight ratio.

7. The method for manufacturing the catalytic site-introduced functional separator according to claim 6, wherein ultrasonic treatment is performed after dispersing the catalytic site in the solvent.

8. A lithium secondary battery comprising a positive electrode; a negative electrode; the catalytic site-introduced functional separator of claim 1 interposed between the positive electrode and the negative electrode; and an electrolyte.

9. The lithium secondary battery according to claim 8, wherein the lithium secondary battery is a lithium-sulfur battery.

10. The method for manufacturing the catalytic site-introduced functional separator according to claim 6, wherein ultrasonic treatment is performed after supplying the conductive carbon to the catalytic site-containing dispersion.

11. The catalytic site-introduced functional separator according to claim 1, wherein a content of the coating layer is 20 μg/cm$^2$ to 120 μg/cm$^2$ relative to a surface area of the base separator.

12. The catalytic site-introduced functional separator according to claim 1, wherein a molar ratio of the metal to the nitrogen in the catalytic site is in a range of 1:2 to 10.

13. The catalytic site-introduced functional separator according to claim 1, wherein the conductive carbon comprises reduced graphene oxide (rGO).

14. The catalytic site-introduced functional separator according to claim 1, wherein the conductive carbon comprises thermally exfoliated reduced graphene oxide (TErGO).

* * * * *